United States Patent [19]

Bannink, Jr. et al.

[11] Patent Number: 4,479,163

[45] Date of Patent: Oct. 23, 1984

[54] INTEGRAL LIGHTNING PROTECTION SYSTEM FOR COMPOSITE AIRCRAFT SKINS

[75] Inventors: Engbert T. Bannink, Jr., Auburn; Glenn O. Olson, Seattle, both of Wash.

[73] Assignee: The Boeing Company, Seattle, Wash.

[21] Appl. No.: 454,206

[22] PCT Filed: Sep. 30, 1982

[86] PCT No.: PCT/US82/01404

§ 371 Date: Sep. 30, 1982

§ 102(e) Date: Sep. 30, 1982

[87] PCT Pub. No.: WO84/01487

PCT Pub. Date: Apr. 12, 1984

[51] Int. Cl.³ ............................................. H05F 1/02
[52] U.S. Cl. .................................... 361/218; 244/1 A

[58] Field of Search ............... 361/212, 216, 217, 218, 361/220; 244/1 A

[56] References Cited

U.S. PATENT DOCUMENTS 3,755,713  8/1973  Paszkowski ......................... 361/218
3,989,984  11/1976  Amason et al. ................. 361/218 X Primary Examiner—Harry E. Moose, Jr.
Attorney, Agent, or Firm—Conrad O. Gardner; Nicolaas DeVogel; Bernard A. Donahue

[57] ABSTRACT

Method and structures for enhancing the conductivity of graphite composite materials for lightning protection and prevention of attachment of lightning to fasteners. The integral lightning protection system for composite aircraft skins, including skins with fasteners penetrating into fuel tanks, utilizes nickel-plated graphite fibers (24) which are woven into the outer layer of fabric of the structural component (10) requiring protection.

3 Claims, 2 Drawing Figures

INTEGRAL LIGHTNING PROTECTION SYSTEM FOR COMPOSITE AIRCRAFT SKINS

The present invention relates to aircraft lightning protection systems and more particularly to lightning protection structures for composite structural components having fasteners.

It is known that the present planned graphite epoxy composite structural components to be used on aircraft will be subjected to natural lightning strike discharges. The most severe strikes will be limited to structures located at or near the aircraft protuberances (wing tips, stabilizer tips, vertical tips, rudder, elevators, ailerons, some engine cowlings, etc.). These locations are designated Zone 1 and will be subjected to the initial attachment of the lightning channel. The initial attachment lightning strike is characterized by a fast rise, high peak current ($2 \times 10^5$ amp) and a large energy transfer ($2 \times 10^6$ amp$^2$ sec). It can create severe structural damage to unprotected graphite epoxy structure (much more so compared to aluminum structure). Other parts of the structure will be subjected to lesser discharges, called swept stroke lightning. These areas are designated Zone 2 and are located aft of the initial attachment points. Particularly sensitive areas are integral fuel tanks and pressurized sections. Punctures cannot be tolerated in either area but fasteners penetrating the skin and protruding into a fuel tank area have been shown to constitute a fuel ignition source even without a skin puncture. Unprotected fasteners are a preferred attachment point for the lightning and spark because the energy cannot be distributed fast enough into the surrounding graphite epoxy material (due to its low thermal and electrical conductivity). The test criteria for Zone 2 also contains a fast rise current but with a $1 \times 10^5$ amp peak and an energy transfer of $0.25 \times 10^6$ amp$^2$ sec.

Representative of the prior art literature is U.S. Pat. No. 3,755,713, assigned to The Boeing Company. Knitted wire mesh is utilized in U.S. Pat. No. 3,755,713 in contrast to preferred embodiments of the present invention which utilize nickel-plated graphite fibers. A decorative layer is shown in the reference patent, thereby providing insufficient coverage for fastener heads. Further, in U.S. Pat. No. 3,755,713 there is no insulation between the fasteners and the structure since the reference structure is fiberglass and therefore nonconductive.

Heretofore, lightning protection material most commonly utilized for non-metallic structures is aluminum. The aluminum is normally applied as a flame spray, a woven screen, a foil or a plating. Such prior method works satisfactorily when the structure is a dielectric such as fiberglass or kevlar epoxy. However, aluminum is galvanically incompatible with graphite epoxy forming the composite structures in accordance with the present preferred embodiments. If not isolated from the graphite epoxy, the aluminum will corrode; if isolated, the aluminum loses its effectiveness as a protection system (no electrical path).

As a consequence of the preceding, it is an object of the present invention to provide a more compatible protection system for graphite epoxy structures to prevent future maintenance problems with the protection system.

It is a further object of the present invention to provide woven outer layer structures for composite structural components which include interwoven nickel-plated graphite fibers.

It is yet a further object of the present invention to provide plating of fiber tows as a function of protection desired, e.g., Zone 1 or Zone 2, in the outer layer of fabric for the structural component requiring lightning protection.

A full understanding of the present invention, and of its further objects and advantages and the several unique aspects thereof, will be had from the following description when taken in conjunction with the accompanying drawing in which.

Figure 1:
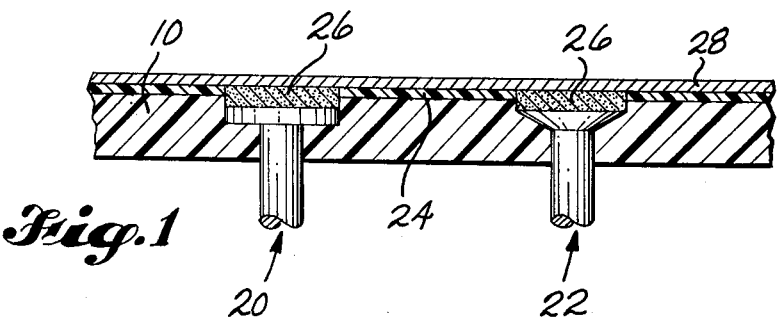
FIG. 1 is cross-sectional view of a composite structure including fasteners showing the present nickel-plated graphite fiber lightning protection.

Turning now to FIG. 1, a composite aircraft skin structure comprising a graphite epoxy laminate 10 is seen to include a protruding head fastener 20 and a countersunk fastener 22. The present lightning protection system utilizes a nickel-plated graphite epoxy fabric ply 24 comprising individual nickel-plated graphite fibers which are woven into the outer layer of fabric for the structural component requiring protection. Depending on the protection desired (for Zone 1 or Zone 2), either 100% of the fiber tows in both the warp and fill direction of fabric 24 can be plated or a lesser percentage (such as every other tow or every third tow).

To protect against a direct attachment to a fastener 20 or 22 by a lightning stroke, the fastener holes are counterbored (or both counterbored and countersunk, see FIG. 1) and the counterbore filled with a potting compound 26. The exterior surface of the integral lightning protection system shown in FIG. 1 is coated with paint and primer 28.

Preliminary test results from a simulated Zone 2 lightning strike were encouraging in that the current spread out over a 5-inch diameter area and the damage did not appear to go beyond the first ply of the integral lightning protection assembly of FIG. 1. In contrast, severe local damage (material blown away and delaminated) was experienced on the unprotected part of the graphite epoxy laminate panel structure.

Figure 2:
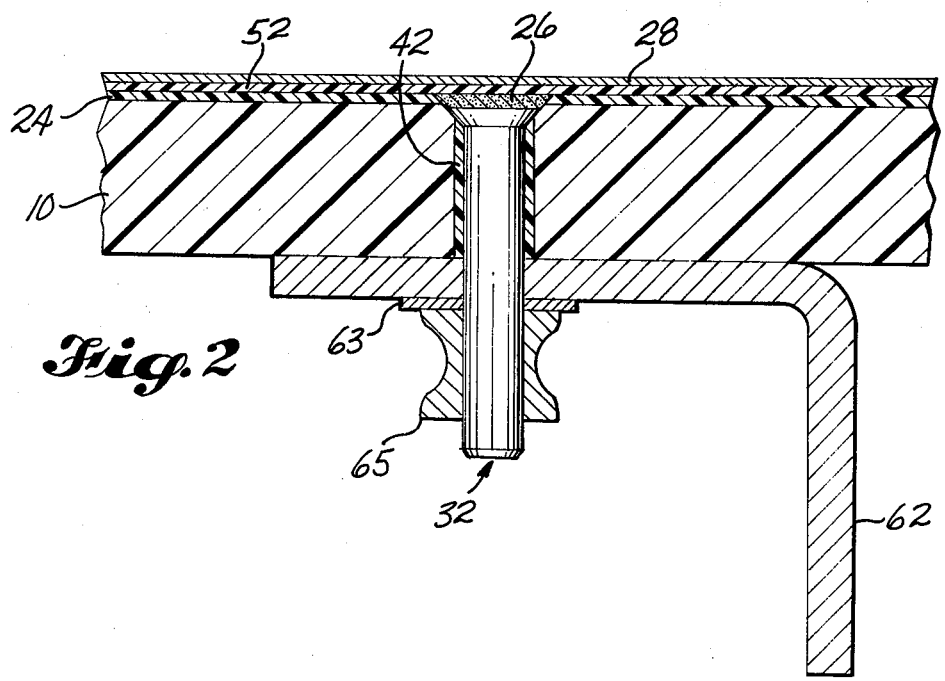
FIG. 2 is a further embodiment of the present invention showing composite structure and fastener with lightning protection features including nickel-plated graphite fibers, fiberglass insert to prevent lightning currents from entering a titanium fastener and/or use of dielectric strip material over a row of fasteners or single fastener.

Turning now to FIG. 2, it will be noted that a glass fiber insulation layer in the form of insert 42 is utilized between titanium fastener 32 and graphite epoxy laminate 10 forming the skin structure of the aircraft. Glass fiber insert 42 further decreases in the present lightning protection system the likelihood of sparking in regions of fuel tanks because of lightning. Lightning currents are thus prevented from entering titanium fastener 32. A further plastic-like strip member 52 sandwiched between nickel-plated graphite epoxy outer ply 24 and primer and paint exterior surface coating 28 extends over a row (or as shown here a single fastener 32).

Titanium fastener 32 is shown in FIG. 2 securing graphite epoxy or titanium angle member 62 with graphite epoxy composite structural member 10, the fastening assembly further including corrosion-resistant stainless steel washer member 63 and corrosion-resistant stainless steel shear collar member 65. Dielectric plastic strip member 52 may comprise a polyester material which is transparent and available under the trade name Mylar, of the DuPont Company of Wilmington, Del., or a polyimide insulation material available from the DuPont Company of Wilmington, Del., under the trade name Kapton.

What is claimed is:

1. An integral lightning protection system for an aircraft graphite epoxy structure having a fastener inserted therein, said fastener including a head portion facing an outer surface portion of said aircraft graphite epoxy structure, said integral lightning protection system comprising:

a nickel-plated graphite fiber fabric ply extending along said outer surface portion of said graphite epoxy structure, said nickel-plated graphite fiber fabric ply further extending over said head portion of said fastener; and, a dielectric layer disposed intermediate said nickel-plated graphite fiber fabric ply and said head portion of said fastener.

2. The invention according to claim 1 wherein less than 100 percent of the fiber tows in both the warp and fill direction of said graphite fiber fabric ply are nickel plated.

3. The invention according to claim 1 wherein a glass fiber insert is disposed around the shaft portion of said fastener.

* * * * *